(12) United States Patent
Rodriguez et al.

(10) Patent No.: US 10,097,743 B2
(45) Date of Patent: Oct. 9, 2018

(54) COMPONENT ATTACHMENT DEVICES AND RELATED SYSTEMS AND METHODS FOR MACHINE VISION SYSTEMS

(71) Applicant: COGNEX CORPORATION, Natick, MA (US)

(72) Inventors: Saul Sanz Rodriguez, Aachen (DE); Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/939,643

(22) Filed: Nov. 12, 2015

(65) Prior Publication Data

US 2016/0191771 A1    Jun. 30, 2016

Related U.S. Application Data

(63) Continuation of application No. 13/645,371, filed on Oct. 4, 2012, now Pat. No. 9,188,839.

(51) Int. Cl.
*G03B 15/03* (2006.01)
*H04N 5/225* (2006.01)

(52) U.S. Cl.
CPC ........... *H04N 5/2256* (2013.01); *G03B 15/03* (2013.01); *H04N 5/2252* (2013.01); *H04N 5/2254* (2013.01); *G03B 2215/056* (2013.01); *G03B 2215/0567* (2013.01); *G03B 2215/0575* (2013.01)

(58) Field of Classification Search
CPC .............. G03B 15/03; G03B 2215/056; G03B 2215/0567; G03B 2215/0575; H04N 5/2252; H04N 5/2254; H04N 5/2256

USPC ........................................................ 348/360
See application file for complete search history.

(56) References Cited

U.S. PATENT DOCUMENTS

| | | | |
|---|---|---|---|
| 4,140,381 A | 2/1979 | Douglas | |
| 4,322,154 A | 3/1982 | Hashimoto et al. | |
| 5,208,624 A | 5/1993 | MacKay | |
| 5,576,781 A | 11/1996 | Deleeuw | |
| 5,576,894 A | 11/1996 | Kuwana et al. | |
| 5,748,388 A | 5/1998 | Nomura et al. | |
| 6,172,748 B1 * | 1/2001 | Sones | G01N 21/9054 356/237.1 |
| 6,339,680 B1 | 1/2002 | Mauvais | |
| 6,694,072 B1 | 2/2004 | Neukermans et al. | |
| 6,819,501 B2 | 11/2004 | Nakamura | |
| 6,889,006 B2 | 5/2005 | Kobayashi | |
| 6,970,201 B1 | 11/2005 | Neil | |
| 7,333,724 B2 | 2/2008 | Chen | |
| 7,722,358 B2 * | 5/2010 | Chatterjee | G06F 3/03543 439/38 |

(Continued)

OTHER PUBLICATIONS

Cano et al, Measuring the deformation of a parallel kinematics machine under dynamic conditions, by combining video and accelerometers, Oct. 9-15, 2006.*

(Continued)

*Primary Examiner* — Shan E Elahi
(74) *Attorney, Agent, or Firm* — Proskauer Rose LLP

(57) ABSTRACT

In some aspects, camera systems can include a camera enclosure, a lens disposed in or along the camera enclosure along an optical axis of the camera system, and an optical accessory attached to camera enclosure, where the optical accessory is attached using a magnetic retention force that is provided by at least one magnetic element.

18 Claims, 4 Drawing Sheets

(56) References Cited

U.S. PATENT DOCUMENTS

| | | | |
|---|---|---|---|
| 7,834,729 B2 * | 11/2010 | Fullerton | G01D 1/00 24/303 |
| 7,899,311 B1 | 3/2011 | Kearney et al. | |
| 8,072,532 B2 | 12/2011 | Lin | |
| 8,103,085 B1 * | 1/2012 | Zadeh | G06T 7/001 356/237.1 |
| 8,300,334 B2 | 10/2012 | Takahashi | |
| 8,372,726 B2 * | 2/2013 | de Graff | H01L 27/14618 257/786 |
| 8,403,680 B2 * | 3/2013 | Schultz | H01R 13/719 439/305 |
| 8,781,312 B1 | 7/2014 | deSouza et al. | |
| 9,188,839 B2 * | 11/2015 | Rodriguez | G03B 15/03 |
| 9,442,527 B2 * | 9/2016 | Schmidt | G06F 1/1632 |
| 9,798,387 B2 * | 10/2017 | Joseph | G06F 3/014 |
| 2002/0131633 A1 * | 9/2002 | Zwick | G06T 7/0002 382/152 |
| 2005/0087601 A1 | 4/2005 | Gerst et al. | |
| 2005/0128751 A1 * | 6/2005 | Roberge | F21K 9/00 362/276 |
| 2005/0280709 A1 * | 12/2005 | Katayama | G01C 11/02 348/187 |
| 2006/0002110 A1 * | 1/2006 | Dowling | F21K 9/00 362/249.05 |
| 2006/0106507 A1 * | 5/2006 | Ledet | G05B 19/4207 701/23 |
| 2006/0275017 A1 | 12/2006 | Sulik et al. | |
| 2007/0156021 A1 | 7/2007 | Morse et al. | |
| 2008/0131111 A1 * | 6/2008 | Messina | G01N 21/8806 396/351 |
| 2008/0226286 A1 | 9/2008 | Huang | |
| 2008/0264413 A1 * | 10/2008 | Doherty | A61M 16/06 128/202.27 |
| 2009/0052049 A1 | 2/2009 | Batchko et al. | |
| 2009/0231537 A1 | 9/2009 | Yamamiya | |
| 2010/0158449 A1 | 6/2010 | Yi | |
| 2010/0165188 A1 | 7/2010 | Jannard | |
| 2010/0202054 A1 | 8/2010 | Niederer | |
| 2010/0225430 A1 * | 9/2010 | Fullerton | G01D 1/00 335/306 |
| 2010/0237709 A1 * | 9/2010 | Hall | B60L 11/182 307/104 |
| 2010/0289885 A1 | 11/2010 | Lu et al. | |
| 2010/0308939 A1 * | 12/2010 | Kurs | H02J 5/005 333/219.2 |
| 2011/0028790 A1 | 2/2011 | Farr et al. | |
| 2011/0070747 A1 * | 3/2011 | Ball | H01R 13/6205 439/39 |
| 2011/0136350 A1 * | 6/2011 | Palli | H01R 13/6205 439/39 |
| 2011/0268434 A1 | 11/2011 | Knoedgen et al. | |
| 2012/0033299 A1 | 2/2012 | Dowell | |
| 2012/0112531 A1 * | 5/2012 | Kesler | B60L 11/182 307/9.1 |
| 2012/0119569 A1 * | 5/2012 | Karalis | B60L 11/1812 307/9.1 |
| 2012/0146576 A1 | 6/2012 | Partovi | |
| 2012/0206050 A1 | 8/2012 | Spero | |
| 2012/0243837 A1 | 9/2012 | Ko et al. | |
| 2012/0293623 A1 | 11/2012 | Nygaard | |
| 2012/0327503 A1 * | 12/2012 | Manassen | G01J 1/4257 359/291 |
| 2014/0078264 A1 * | 3/2014 | Zhang | G06T 7/0057 348/47 |
| 2014/0098225 A1 * | 4/2014 | Rodriguez | G03B 15/03 348/143 |
| 2014/0240559 A1 * | 8/2014 | Ueno | H04N 5/335 348/294 |
| 2014/0283827 A1 * | 9/2014 | Flower | A61M 16/06 128/202.27 |
| 2014/0285625 A1 * | 9/2014 | McGarry | G01C 11/025 348/46 |
| 2015/0093920 A1 * | 4/2015 | Colantuono | H01R 13/6205 439/39 |
| 2015/0234427 A1 * | 8/2015 | Schmidt | G06F 1/1632 361/679.43 |
| 2015/0362828 A1 * | 12/2015 | Patel | G03B 17/565 348/75 |
| 2016/0010990 A1 * | 1/2016 | McGarry | G01C 11/025 348/46 |
| 2016/0191771 A1 * | 6/2016 | Rodriguez | G03B 15/03 348/360 |
| 2017/0205879 A1 * | 7/2017 | Joseph | G06F 3/014 |
| 2017/0317444 A1 * | 11/2017 | Narayanasamy | H01R 13/6205 |

OTHER PUBLICATIONS

Ardhy et al, Development of SBC based machine-vision system for PCB board assembly automatic optical inspection, Nov. 29-30, 2016.*

* cited by examiner

COMPONENT ATTACHMENT DEVICES AND RELATED SYSTEMS AND METHODS FOR MACHINE VISION SYSTEMS

CROSS-REFERENCE TO RELATED APPLICATIONS

This application is a continuation of U.S. patent application Ser. No. 13/645,371, titled "Component Attachment Devices and Related Systems and Methods for Machine Vision Systems," filed on Oct. 4, 2012, the entire contents of which are incorporated herein by reference.

TECHNICAL FIELD

This disclosure relates to imaging systems, and more particularly, to component attachment devices and related systems and methods for machine vision systems.

BACKGROUND

Machine vision systems can use image acquisition devices, such as an electronic imaging device (e.g., a CMOS or CCD camera sensor) to acquire images of objects or encoded symbols disposed on the objects, including, for example, bar codes, data matrixes, and other symbols. The acquired image can then be processed using an identification algorithm to decode the pattern provided in the image or symbol, to acquire data about the object to which the image or symbol is affixed. These devices are used in both retail and manufacturing environments for providing pricing of objects or goods, monitoring and maintaining stock, and tracking industrial parts. The machine vision systems can include one of more of various optical accessories that can be used adjust or alter the acquired images. In some cases, optical accessories can be mounted (e.g., temporarily secured) to portions of the machine vision system.

For example, effective acquisition and processing of an encoded symbol by the machine vision system typically requires the object containing the symbol to be properly illuminated. Effective illumination can require one or more types of lighting to be positioned on or near the machine vision system.

Other types of optical accessories can also be used.

SUMMARY OF THE INVENTION

In some aspects, an optical accessory can include a camera illumination module capable of positioning at least one illumination element relative to a lens of a machine vision device. The illumination module can include a structural base (e.g., an illumination board) having a first surface and including at least one illumination element disposed along the first surface; at least one mounting element extending from a second surface of the illumination board; and a magnetic element arranged at a distal end of one of the at least one mounting elements. The magnetic element can be configured to (i) be received along a surface of the machine vision device; and (ii) generate a magnetic retention force suitable to secure the illumination module to the surface of the machine vision device.

In some aspects, a machine vision system for imaging an inspection field can include a camera device comprising a housing defining a camera axis; a lens disposed within a lens receptacle of the housing along the camera axis; and an optical accessory. The optical accessory can include a structural base having a first surface; at least one mounting element extending from a second surface of the structural base; and a magnetic element arranged at a distal end of one of the at least one mounting elements. The magnetic element can (i) be received along a surface of the housing; and (ii) generate a magnetic retention force suitable to secure the optical accessory to the surface of the housing.

In some aspects, an optical accessory can include a supplemental lens device to be coupled to a surface of a machine vision device along a camera axis of an imaging device of the machine vision device. The supplemental lens device can include a lens module configured to be removably attached to a lens of the imaging device; and a magnetic element disposed in or on the lens module, where the magnetic element is configured to generate a magnetic retention force to attach the lens module to a surface of the machine vision device.

In some aspects, a camera system can include a camera enclosure; a lens disposed in or along the camera enclosure along an optical axis of the camera system; and an optical accessory attached to camera enclosure, the optical accessory being attached using a magnetic retention force that is provided by at least one magnetic element.

In some aspects, a machine vision system for illuminating and imaging an inspection field can include a camera device having a housing containing an imaging device defining a camera axis and a control unit connected to the imaging device, the housing defining a lens receptacle along the camera axis; a lens disposed within the lens receptacle; a first optical accessory (e.g., a supplemental lens device) coupled to the lens along the camera axis and a second optical accessory (e.g., an illumination module) coupled to the camera device or the supplemental lens device. The supplemental lens device can include a lens module configured to be removably attached to the lens; and a first magnetic element disposed in or on the lens module, where the first magnetic element is configured to generate a magnetic retention force to attach the lens module to the lens of the imaging device. The illumination module can include a structural base (e.g., an illumination board) having a first surface and including at least one illumination element disposed along the first surface; at least one mounting element extending from a second surface of the structural base; and a second magnetic element arranged at a distal end of one of the at least one mounting element, where the second magnetic element is configured to: (i) be received along a surface a component of the camera device; and (ii) generate a magnetic retention force suitable to secure the illumination module to the surface of the camera device.

In some aspects, a method for installing an optical accessory (e.g., a supplemental lens device) along a camera axis of an imaging device of a machine vision camera system having a lens disposed in a lens receptacle along the camera axis can include disposing a magnetic element in or on the supplemental lens device; using a magnetic force provided by the magnetic element to axially couple the supplemental lens device to the lens relative to the camera axis; aligning the supplemental lens device relative to the lens disposed in the imaging device; and electrically connecting the supplemental lens device to the machine vision camera system.

Embodiments can include one or more of the following features.

In some embodiments, an optical accessory can further include an alignment feature that limits the orientation of the optical accessory relative to the machine vision device. For example, the at least one mounting element can include a first mounting element and a second mounting element, and the alignment feature can include a size and/or shape of the first mounting element being different than a size and/or shape of the second mounting element.

In some embodiments, the alignment feature includes a distal end of the first mounting element having a first cross sectional shape and a distal end of the second mounting element having a second cross sectional shape, wherein the first cross sectional shape is configured to be received in a first receptacle along the face of the machine vision device and is configured to be prevented from being received in a second receptacle along the face of the machine vision device, and wherein the second receptacle is configured to receive the second cross sectional shape. In some cases, the first cross sectional shape has a first average width and the second cross sectional shape has a second average width, where the first average width is greater than the second average width so that the distal end of the first mounting element is receivable in the first receptacle but not the second receptacle.

In some embodiments, the at least one mounting elements includes at least two mounting elements and the alignment feature includes a difference in angular spacing between two adjacent mounting elements relative to a central axis of the optical accessory (e.g., illumination module). In some cases, the at least two mounting elements include a first mounting element and a second mounting element, where the difference in angular spacing is a difference between i) a first angular spacing between the first and second mounting elements relative to the central axis of the optical accessory and ii) a second angular spacing between the first and second mounting elements relative to the central axis, where the first angular spacing and the second angular spacing are different regions of a total circumferential region around the central axis, and where the difference between the first angular spacing and the second angular spacing limits the orientations in which the optical accessory can be attached to the machine vision camera device.

In some embodiments, the magnetic element includes a first magnet and the alignment feature includes an arrangement of the first magnet relative to the machine vision device. In some cases, the alignment feature includes an arrangement of a magnetic polarity of the first magnet relative to an arrangement of a magnetic polarity of a second magnet disposed in or on the machine vision device.

In some embodiments, the at least one mounting element include an elongated member extending from the second surface of the structural base. In some embodiments, one or more mounting elements are disposed at a non-zero degree angle (e.g., approximately orthogonal) relative to the second surface. In some embodiments, the optical accessory includes three or more elongated mounting elements.

In some embodiments, the optical accessory can include a second magnetic element disposed along the structural base that is configured to couple to another (e.g., a second) optical accessory. In some cases, the optical accessory can include the second optical accessory magnetically coupled to the structural base.

In some embodiments, the optical accessory also includes an electrical attachment element electrically coupled to the structural base, where the electrical attachment element is configured to electrically connect the at least one illumination element to at least one of a power source, a control device, or a signal generating device of the machine vision device. In some cases, the signal generating device includes an acquisition signal generating device, such as any one of various sensors (e.g., a temperature sensor) that is arranged on the structural base.

In some embodiments, the magnetic element comprises a ferromagnetic element configured to generate the magnetic retention force with a magnet disposed along the surface of the camera device or machine vision system.

In some embodiments, the machine vision system or the optical accessory can include an electrical attachment element electrically coupled to the structural base, where the electrical attachment element electrically connects the optical accessory or a component thereof (e.g., the illumination board or the lens module) to at least one of a power source or a control device of the machine vision device. In some embodiments, the electrical attachment element includes an electrical connector providing a wired connection to the structural base. The electrical connector can be configured to be connected to the machine vision system. For example, the electrical attachment element can include an electrical contact region along a distal end of one of the at least one mounting element. The electrical contact region can be configured to, upon contact with a mating electrical contact surface, electrically connect the optical accessory (e.g., the at least one illumination element) to the at least one of the power source or the control device. In some cases, the electrical contact region and the magnetic element are disposed along a distal end of the same mounting element. In some cases, the electrical attachment element includes one or more resilient, deflectable connecting pins (e.g., spring loaded contact pins). In some embodiments, the magnetic retention force connects the electrical contact region to the mating electrical contact surface.

In some embodiments, the optical accessory includes a camera lens illumination module and the structural base includes an illumination board having at least one illumination element disposed along the first surface.

In some embodiments, the lens is generally stationary within the lens receptacle.

In some embodiments, the housing contains an imaging device defining the camera axis and a control unit connected to the imaging device.

In some embodiments, the surface of the machine vision device is a surface of a ferromagnetic retaining element disposed around the lens.

In some embodiments, the lens module includes an adjustable lens that is configured to change an optical characteristic of the machine vision device. For example, the adjustable lens can include a variably adjustable lens (e.g., a liquid lens device).

In some embodiments, the magnetic element is configured so that when the lens module is attached to the lens via the magnetic retention force, the lens module is generally fixed axially along the camera axis, and the lens module is able to rotate about the camera axis.

In some embodiments, a second magnetic element is disposed along the lens module, where the second magnetic element is configured to couple to an optical accessory. In some cases, a second optical accessory is magnetically coupled to the lens module.

In some embodiments, the at least one magnetic element is a component of the optical accessory.

In some embodiments, the optical accessory comprises an alignment feature or mechanism that limits an installed orientation of the optical accessory relative to the camera enclosure.

In some embodiments, the magnetic retention force is generated between a first magnetic element of the at least one magnetic element that is disposed on the optical accessory and a ferromagnetic retaining element disposed on the lens, and in an attached configuration, the first magnetic element is spaced apart from the ferromagnetic retaining element.

In some embodiments, the using the magnetic force provided by the magnetic element to axially couple the supplemental lens device to the lens includes positioning the magnetic element disposed on or in the supplemental lens device proximal to a ferromagnetic retaining element (e.g., retaining ring) affixed to the lens.

In some embodiments, the method can also include adjusting the supplemental lens to change a focal length of the machine vision camera system.

As used herein, the term magnet is intended to refer to a material or object that produces a magnetic field. The magnetic field includes a force that attracts ferromagnetic materials, such as ferrous materials (e.g., iron) and attracts or repels other magnets.

A permanent magnet is typically an object made from a material that is magnetized and creates its own magnetic field. Ferromagnetic materials are materials that capable of being attracted to a magnet and are typically capable of being magnetized. Some examples of ferromagnetic materials include iron, nickel, cobalt, some alloys of rare earth metals, and some naturally occurring minerals, such as lodestone.

Ferromagnetic materials can be divided into magnetically "soft" materials like annealed iron, which can be magnetized but do not tend to stay magnetized, and magnetically "hard" materials, which do. Permanent magnets are typically made from "hard" ferromagnetic materials, such as alnico and ferrite, which are subjected to special processing in a powerful magnetic field during manufacture, to align their internal microcrystalline structure, making them very hard to demagnetize.

Magnets can also include an electromagnet. An electromagnet typically includes a coil of an electrical conductor (e.g., wire) that generates a magnetic field when an electric current passes through the wire. The coil stops producing the magnetic field when the current no longer passes through the wire. In some cases, the coil is wrapped around a core of ferromagnetic material, such as steel, which enhances the magnetic field produced by the coil.

Embodiments can have one or more of the following advantages.

In some aspects, an optical accessory (e.g., an illumination module or supplemental lens device) that is able to quickly and easily couple to a camera device (e.g., a machine vision system) using magnetic force can be attached and removed faster and easier than some other optical accessories, such as optical accessories that are connected to camera devices using fasteners or other, more complex, attachment methods. Such an advantage can be realized because, in some cases, fasteners and other attachments methods can require the use of additional tools for installation and removal. For example, when a camera device is mounted in a hard to access location, a person can remove the optical accessory (e.g., an illumination module) by simply pulling the optical accessory off of the camera device (e.g., with one hand), manually adjust or change the lens (e.g., with the opposite hand), for example, to adjust the focal distance of the camera device, and then reattach the optical accessory to the camera device.

By being able to be attached, removed, and re-attached to the camera device faster and easier, a person (e.g., a mechanic) working on the camera device can remove the optical accessory, adjust the camera lens, and reinstall the optical accessory more quickly. Quicker disassembly and reassembly can reduce maintenance and downtime of the camera device, which can result in shorter downtimes of automated manufacturing, production, or inspection lines on which the camera system is used.

In some aspects, an optical accessory having attachment or alignment features or mechanisms as described herein can help limit the optical accessory from being inadvertently attached to a camera device in an incorrect orientation. In some cases, for example, when the optical accessory is a lighting device (e.g., an illumination module), limiting undesirable alignment of the illumination module can help create a proper illumination environment along the illumination field based on the needs of the camera device and environment that the camera device is imaging. As a result, repair or reconstruction of a camera device can be reduced and thus, downtimes of the automated manufacturing, production, or inspection lines on which the camera device is used can be reduced.

DETAILED DESCRIPTION

In some aspects, some components of a machine vision system, such as optical accessories (e.g., illumination devices, camera focus systems (e.g., autofocus lens systems (e.g., liquid lens systems)), camera protective devices (e.g., protective lens cap devices), optical filters, and various other types of optical accessories), can be connected to and disconnected from a camera device of the machine vision system using magnetic connection elements.

Figure 1:
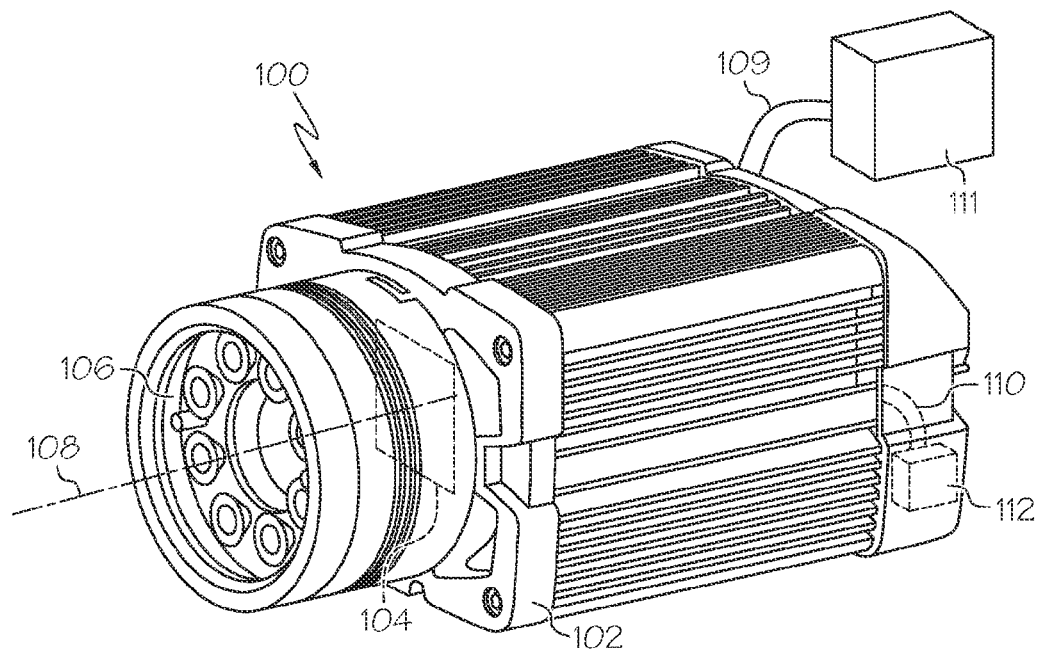
FIG. 1 is a perspective view of an exemplary machine vision system.

Referring to FIG. 1, in some embodiments, a machine vision system 100 includes a housing 102, an imaging sensor 104 (illustrated in dashed lines) within the housing 102, and a lens system (e.g., an adjustable lens device) 106 disposed along an outer surface of the housing 102. The imaging sensor 104 defines an optical axis (e.g., a camera axis) 108 that is generally perpendicular to the imaging sensor 104. During use, the imaging sensor 104 is able to capture (e.g., electronically decode) images of objects positioned along and in the proximity of the camera axis 108.

The lens system 106 is connected to the housing 102 (e.g., connected with fasteners, connected directly via a threaded connection, or otherwise secured to the housing 102) and is substantially aligned to the camera axis 108. One or more components of the machine vision system 100, such as the imaging sensor 104, are connected (e.g., electrically connected via a cable 110) to a control unit (e.g., an internal control unit) 112, which receives data from the imaging sensor 104 and decodes the data for processing. The machine vision system 100 can be connected (e.g., electrically connected via a wired connection 109) to a user interface device 111 for use or processing. While the machine vision system 100 illustrated is typically intended for fixed reading applications, hand held camera systems or other scanning devices can include substantially similar components and could also be used along with the systems and methods described herein.

The machine vision system 100 can include one or more optical accessories or devices, such as illumination devices (e.g., camera lens illumination modules) to illuminate an area (e.g., an object inspection field) in front of the lens system 106 for adequate viewing and imaging capabilities. In particular, the camera lens illumination module can illuminate a target area along the camera axis 108 so that images of objects in the inspection field can be captured for processing. The attachment and use of other types of optical accessories is further described below.

Figure 2:
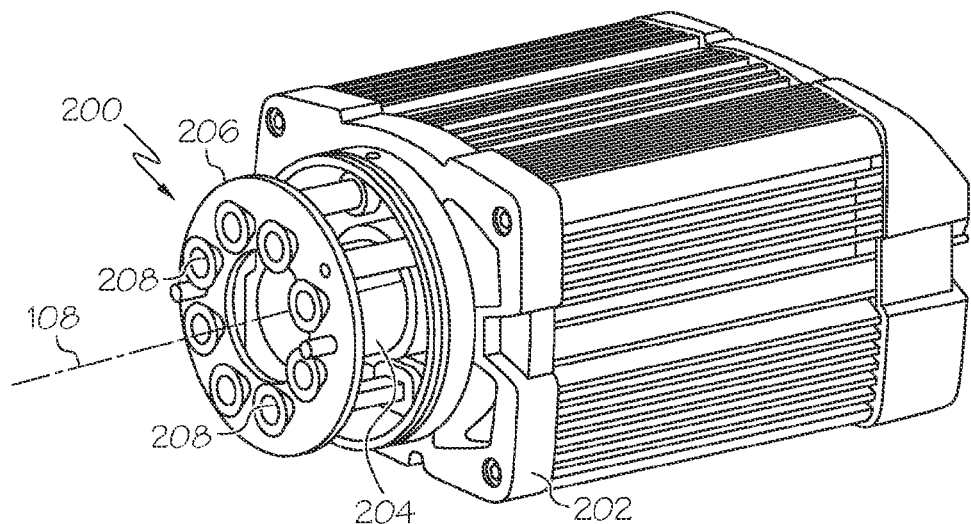
FIG. 2 is a perspective view of an exemplary illumination module magnetically connected to a portion of a housing of a machine vision system.

For example, referring to FIG. 2, in some embodiments, an optical accessory (e.g., a camera illumination module) 200 can be coupled to a portion of a camera housing 202 of a camera system in which a camera lens 204 that defines the camera axis 108 is disposed. The illumination module 200 includes a generally flat structural base (e.g., an illumination board) 206 that has a first, forward-facing surface along which one or more illumination elements 208 are arranged. The illumination elements 208 can include any of various types of light emitting devices, such as light emitting diodes (LEDs), organic light emitting diodes (OLEDs), liquid crystalline displays (LCDs), or other suitable light emitting devices. While the illumination module has been described as having multiple illumination elements, in some embodiments, the illumination module includes only one illumination element. In some embodiments, the generally flat structural base does not include illumination elements.

In some embodiments, the illumination board 206 is in the form of a circuit board (e.g., a printed circuit board) and the illumination elements 208 are in the form of surface mounted light emitting elements (e.g., surface mounted LEDs) arranged along the printed circuit board. As illustrated, in some embodiments, the illumination board 206 is in form of a substantially round, disk-shaped circuit board having a hole formed in a central region. The hole is sized and shaped to permit the camera lens 204 to view an inspection field through the hole in the illumination board 206. In some embodiments, the hole has a diameter that is about 1 millimeter to about 5 millimeters greater than the diameter of the lens 204. For example, when the lens 204 is in the form of an M12 sized lens, the hole can have a diameter that is about 15 millimeters to about 18 millimeters. In another example, when the lens 204 is in the form of a C-mount lens, the hole can have a diameter that is about 35 millimeters to about 40 millimeters.

Figure 3:
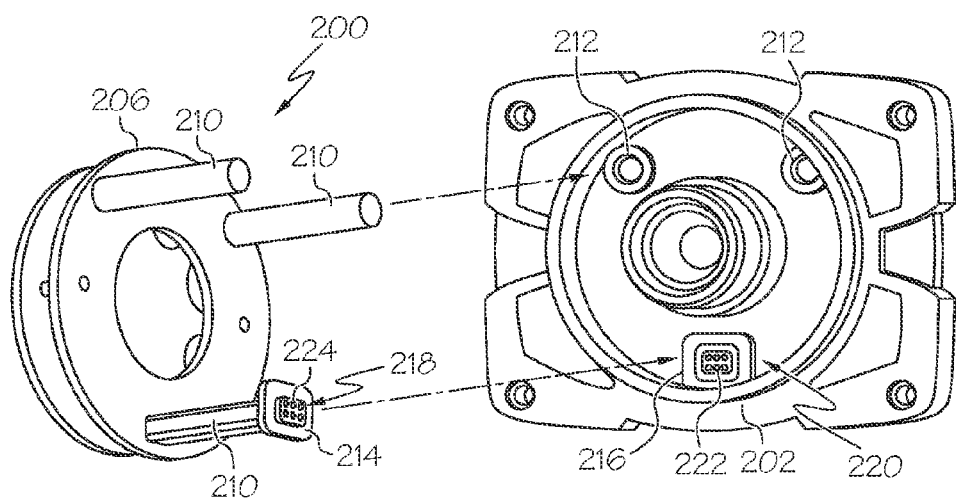
FIG. 3 is an exploded perspective view of the illumination module and the housing of FIG. 2 disconnected from one another.

Referring to FIG. 3, the illumination module 200 includes at least one (e.g., three in the example illustrated in FIG. 3) mounting element 210 extending from a second, rear-facing surface of the illumination board 206 so that the illumination module 200 can be connected to the camera housing 202. The mounting elements 210 extend from the illumination board 206 at non-zero angles (e.g., substantially perpendicular angles) relative to the second, rear facing surface of the illumination board 206. As shown, the mounting elements 210 are typically spaced around the illumination board 206 at substantially equal distances (e.g., substantially equal angular distances relative to a central axis) apart from one another. However, in some embodiments, the mounting elements can be arranged at different distances from one another around the illumination board. The mounting elements 210 are typically sized having a length that is large enough so that when installed, the illumination board 206 is spaced in front of the camera lens 204 (i.e., spaced farther from the housing 202 than the camera lens 204). Such spacing can help reduce or limit shadows in the inspection field, which could potentially be formed by the camera lens 204 if the illumination elements 208 were spaced behind the camera lens 204.

As illustrated in FIG. 3, in some embodiments, the mounting elements 210 are substantially cylindrical, elongated beam-like elements that have a generally round cross-sectional shape. For simplicity, the other portions of the housing and the camera system are not illustrated in FIG. 3. However, the mounting elements can have other cross-sectional shapes. For example, the mounting elements can have a cross sectional shape including other curved shapes (e.g., oblong, ellipsoid, or oval shapes), polygonal shapes (e.g., rectangular, square, pentagonal, hexagonal, or other polygonal shapes), or a shape including a combination of one or more curved and/or straight sides.

The mounting elements 210 are spaced around the illumination board 206 so that they can be received within multiple mounting recesses 212 formed along the camera housing 202. The mounting recesses 212 are typically sized and shaped similarly to, but slightly larger than, the cross-sectional size and shape of the mounting elements 210. For example, as illustrated in FIG. 3, when substantially round mounting elements 210 are used, the mounting recesses 212 are formed as substantially round recesses sized to receive the mounting elements 210.

The mounting elements 210 can be formed by any suitable manufacturing techniques (e.g., molding or machining) and can be formed of any suitable materials, such as metal, plastic, composite material, or any suitable combination of these materials. The mounting elements 210 can be connected to the illumination board 206 using any of various suitable connection techniques or methods including attached using fasteners (e.g., screws or rivets), bonded using adhesives (e.g., glue or epoxy), mechanically bonded (e.g., welded, soldered, or attached via a press-fit connection), or otherwise suitably connected. In some embodiments, the mounting elements 210 and the illumination board 208 are formed as a unitary component.

At least one of the mounting elements 210 includes a retention element, such as a magnetic element (e.g., a magnet or a ferromagnetic element) 214 disposed a distal end (i.e., the end facing away from the illumination board 206) of the mounting element 210. The magnetic element 214 can be attached to the mounting element 210 by any of various suitable methods including a fastened connection, a bonded connection, or press-fit connection. The magnetic element 214 is sized and configured to magnetically couple an adjoining magnetic receiving element (e.g., a ferromagnetic element or a magnet) 216 disposed on or along the housing 202. For example, the magnetic receiving element 216 can be a ferromagnetic element coupled (e.g., fastened, bonded, or pressed) to the housing 202. In some embodiments, the magnetic receiving element 216 is formed as an integral component of the housing 202.

The magnetic element 214 is configured to produce a magnetic field that generates a magnetic retention force that is sufficient to couple the illumination module 200 to the housing 202. For example, in some embodiments, the magnetic retention force generated between the magnetic element 214 and the magnetic receiving element 216 can be about 0.5 lbf to about 5 lbf.

The magnetic attachment between the optical accessory and the machine vision system can be in the form of multiple configurations. For example, as illustrated, in some embodiments, the magnetic element disposed on the mounting element can include a magnet and the magnetic receiving element on the housing can include a ferromagnetic element that is configured to generate a magnetic force with the magnet. Alternatively, in some embodiments, the magnetic element disposed on the mounting element can include a ferromagnetic element and the magnetic receiving element on the housing can include a magnet that is configured to generate a magnetic force with the ferromagnetic element. Alternatively, in some embodiments, the magnetic element disposed on the mounting element can include a magnet and the magnetic receiving element on the housing can also include a magnet. The two magnets can be arranged to generate a magnetic force between one another. For example, the magnets can be arranged to have opposite magnetic polarities facing towards each other (e.g., a North magnetic pole of one magnet facing a South magnetic pole of the other magnet).

The magnetic element 214 is typically in the form of a permanent magnet, such as a rare-earth magnet. In the example illustrated, the magnetic element is a neodymium magnetic element. In some embodiments, the magnetic element includes a composite permanent magnet (e.g., a ceramic magnet, a ferrite magnet, an alnico magnet, or a flexible magnet). Alternatively or additionally, other types of magnets could be used, such as electromagnets.

In some embodiments, the illumination module 200 includes an electrical attachment element to provide electrical power to the optical accessory, for example, to power and control the illumination elements 208. For example, referring to FIG. 3, in some embodiments, an electrical attachment element 218 is in the form of an electrical connector disposed at a distal end of one of the mounting elements 210. The electrical attachment element 218 is connected to the illumination elements 208, for example, via a wired connection (e.g., a wire harness) disposed within the mounting element 210 to conductive regions along the illumination board 206 along which the illumination elements 208 are disposed. Using the electrical attachment element 218 and conductive regions of the illumination board 206, electricity can be distributed and delivered from the camera system to the illumination elements 208. For example, electrical control signals or acquisition signals, such as those transmitted from a sensor (e.g., a temperature sensor) arranged on the illumination board 206 can be sent between the control unit 112 and the illumination board 206 via the electrical attachment element 218. In particular, the electrical attachment element 218 is sized and configured to be electrically connected to a receiving electrical connector 220 arranged along the housing 202 that is electrically connected to one or more of the imaging sensor 104 or the control unit 112. Therefore, once connected, the illumination module 200 can be operated by the camera system to properly operate the illumination elements 208 to produce a desired illumination field based on the environment in which the camera system is used.

In some embodiments, the electrical attachment element 218 and the receiving electrical connector 220 are in the form of an electrical connector having one or more resilient, deflectable electrical connecting pins 222. In some embodiments, the deflectable electrical connecting pins include one or more pins that are biased (e.g., spring loaded) towards an intended mating electrical contact surface. Using the deflectable electrical connecting pins 222, an electrical connection between the electrical attachment element 218 and the receiving electrical connector 220 can be established without the two connectors being integrally coupled to one another (i.e., without a male connector having to be inserted and retained within a female connector). For example, when the electrical attachment element 218 is placed against or along the receiving electrical connector 220 having the deflectable electrical connecting pins 222, the deflectable electrical connecting pins 222 make contact with, and are deflected by, mating electrical contacts 224 disposed along the electrical attachment element 218 to establish the desired electrical connection. Typically, when the illumination module 200 is installed onto the camera housing 202, the magnetic element 214 provides a magnetic retention force that temporarily secures the electrical attachment element 218 against the receiving electrical connector 220 to deflect the deflectable electrical connecting pins 222 and establish the electrical connection.

Referring to FIG. 3, the electrical attachment element 218 and the magnetic element 214 can be arranged at a distal end of the same mounting element 210. Using this type of configuration having the magnetic element 214 surrounding the electrical attachment element 218, when the illumination module 200 is installed onto the camera housing 202, the magnetic element 214 can help align the electrical attachment element 218 and the receiving electrical connector 220, and therefore also help align the deflectable electrical connecting pins 222 to the mating electrical contacts 224.

As discussed above, the illumination module 200 can typically be quickly and easily attached to the camera housing 202 using the magnetic element 214. To install the illumination module 200, the illumination module 200 can be aligned to the housing 202 (e.g., aligned centrally along the camera axis 108) so that the electrical attachment element 214 is aligned with the receiving electrical connector 220 and so that each of the mounting elements 210 are aligned with an appropriate mounting recesses 212. Once aligned, the illumination module 200 can simply be moved towards and placed onto the housing 202. When placed onto the housing 202, the magnetic element 214 generates a magnetic retention force that holds the illumination module 200 to the housing 202. As discussed above, this retention force also helps to establish an electrical connection by deflecting the electrical connecting pins 222 with the mating electrical contacts 224. Once connected, the illumination elements 208 can be operated (e.g., by the camera device or control unit) to illuminate a target area along the camera axis 108 so that images of objects positioned in the inspection field can be captured for processing by the control unit.

As discussed below, in some embodiments, the optical accessory can include an electrical connection (e.g., a wire harness) having wires that are connected (e.g., soldered) to the illumination board. The wire harness can have a connector configured to engage a mating connector on the machine vision system.

Optical Accessory Method of Use

Using the optical accessory (e.g., illumination module 200), a machine vision system can be set up for use, and adjusted during use when desired, quicker and easier than some other illumination modules. For example, the machine vision system can be mounted in place so that the camera axis 108 is generally directed towards a desired inspection field, such as a region of a manufacturing line. With the camera system in place, the lens 204 can be adjusted (e.g., manually adjusted by hand) to properly focus the camera system. Once the lens 204 is properly adjusted based on the desired inspection field, the illumination module 200 can be placed on the camera housing 202 and retained via the magnetic retention force generated by the magnetic element 214. As discussed above, when the illumination module 200 is installed onto the camera housing 202, the magnetic retention force also holds the electrical attachment element 218 against the receiving electrical connector 220 to deflect the deflectable electrical connecting pins 222 and establish the electrical connection. Once installed, the illumination module 200 can be powered and operated so that the illumination elements 208 emit light to illuminate the desired inspection field.

If, during use, it is desired to change or adjust the lens 204 (e.g., as a result of a change in the inspection field or a change in the objects being imaged), the illumination module 200 can simply be removed (e.g., by pulling the illumination module 200 off of the housing 202 by hand), the lens 204 can be changed or adjusted, and then the illumination module 200 can be reinstalled (e.g., by being placed by hand back onto the housing 202). This capability to quickly modify the camera system without the use of additional tools or complex techniques can help reduce the downtime of the environment in which the camera systems are used, and thus can help reduce lost operating time that could have otherwise resulted during such adjustments. In some cases, being able to remove, adjust, and/or replace optical accessories with just one hand can be advantageous when the machine vision device is difficult to access areas, for example, when the machine vision system is located in the vicinity of automated processing areas (e.g., six feet above a conveyor belt).

While certain embodiments have been described, other embodiments are possible.

In some embodiments, the optical accessory includes an alignment feature that helps to limit the installed orientation of the optical accessory relative to the camera housing. For example, in some embodiments, the alignment feature includes the magnetic element being arranged so that its magnetic polarity limits the orientations in which the optical accessory can be attached to the housing. In some embodiments, more than one mounting element (e.g., two mounting elements) includes a magnetic element and the magnetic elements are arranged so that, due to their magnetic polarity, the optical accessory can only be properly attached to the housing in one orientation.

Figure 4:
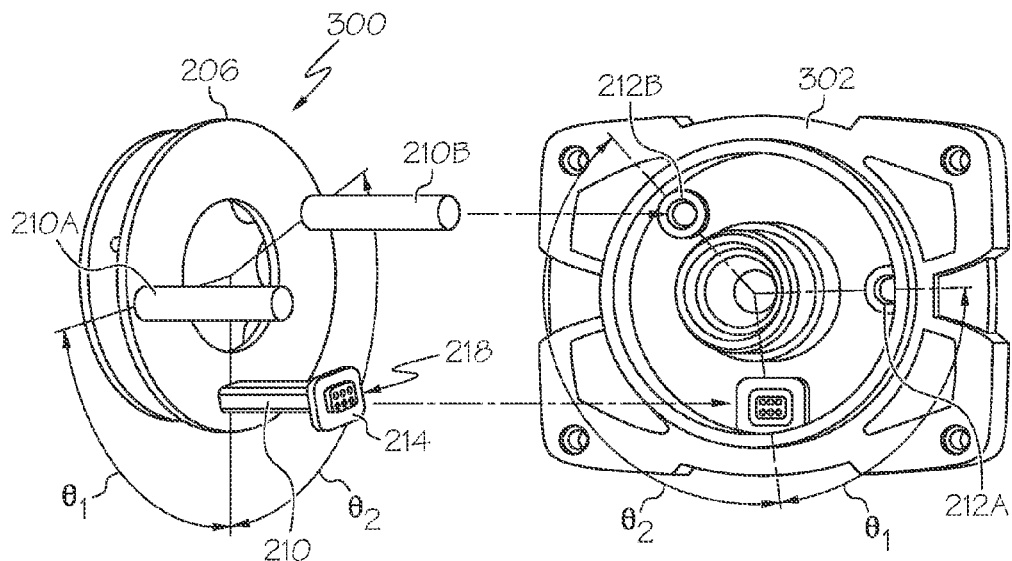
FIG. 4 is an exploded perspective view of another exemplary illumination module magnetically connected to a portion of a housing of another machine vision system.

For example, in some embodiments, the locations of the mounting elements can help limit the orientations in which the optical accessory can be installed. For example, referring to FIG. 4, in some embodiments, an optical accessory (e.g., illumination module) 300 includes mounting elements 210A, 210B that are spaced apart from one another or spaced apart from a central mounting element 210 by different distances. As illustrated, a first mounting element 210A is spaced apart from the mounting element 210, which includes a magnetic element 214 and an electrical attachment element 218, by a first angle $\theta_1$ relative to a central axis of the illumination module 300. Whereas, a second mounting element 210A is spaced apart from the mounting element 210 by a different, second angle $\theta_2$ relative to the central axis of the illumination module 300. To receive the illumination module 300, a housing 302 includes a first mounting recess 212A and a second mounting recess 212B that are arranged at the first angle $\theta_1$ and the second angle $\theta_2$, respectively, relative to the receiving electrical connector 220. In this configuration, as a result of the locations of the mounting elements 210A, 210B and the mounting recesses 212A, 212B, the illumination module 300 can only be properly installed in one orientation relative to the housing 302. When improperly aligned, if one of the mounting elements is aligned with its unintended mounting recess, then an adjacent mounting element would inadvertently come into contact with the housing (i.e., and not an intended mounting recess).

Alternatively or additionally, in some embodiments, two mounting elements each include a magnetic element disposed along their distal end, where the two magnetic elements have outwardly facing polarities that are opposite from one another (e.g., one magnetic element has its North pole facing outward and the other magnetic element has its South pole facing outward). To receive the two magnetic elements of the mounting elements, the camera system (e.g., the housing) can include two mating magnetic receiving elements that include magnetic elements also arranged so that they have opposite polarities facing outward to magnetically attract the magnetic elements disposed on the mounting elements when the optical accessory is arranged in a desired, proper alignment. For example, using this configuration, if the optical accessory is placed against the housing in an incorrect alignment, the polarities of the magnetic elements will typically cause the improperly aligned magnetic elements to repel one another and prevent the optical accessory from being installed incorrectly.

Alternatively or additionally, in some embodiments, the alignment feature includes the mounting elements and the mounting recesses having different cross-sectional shapes or sizes. For example, in some embodiments, the optical accessory includes at least two mounting elements that have different cross-sectional widths (e.g., average diameters) so that the mounting elements can only fit into the mounting recesses in one orientation. That is, in an incorrect orientation relative to the housing, at least one of the mounting elements has diameter that is too large to fit into a mounting recess, which has a smaller diameter to accommodate the mounting element with the smaller diameter.

Additionally or alternatively, in some embodiments, the optical accessory includes at least two mounting elements that have different cross-sectional shapes. For example, an optical accessory can include one mounting element having a generally round cross-sectional shape sized to be received in a generally round mounting recess and one mounting element having a generally square cross-sectional shape that is sized to be received within a generally square shaped mounting recess. Therefore, as a result of the differently shaped mounting elements and mounting recesses, the optical accessory can only be properly attached to the housing in one orientation. While the differently shaped mounting elements have been described as round and square shaped mounting elements, any two suitably differently shaped mounting elements could be used to limit an installed orientation.

Additionally or alternatively, in some embodiments, the optical accessory includes a first mounting element, which includes the magnetic element and the electrical attachment element, and a second mounting element that is received in a mounting recess. Therefore, based on the structural differences between the receiving electrical connector and the mounting recess arranged along the housing, the optical accessory can only be properly installed in one orientation.

While the optical accessory has been described as having elongated mounting elements that act as standoffs to space the optical accessory from the housing, other configurations are possible. For example, in some embodiments, the mounting elements are in the form of beam-like standoffs that are mounted or otherwise connected to and extending from the camera housing instead of the structural base. In such embodiments, the structural base can be attached to the mounting elements (i.e., as opposed to the structural base and mounting elements being attached to the housing). In some embodiments, both the structural base and the housing can include one or more mounting element portions that extend from the structural base and the housing, respectively, to properly space the structural base relative to the camera housing and the camera lens.]

While the optical accessory has been described and illustrated as having three mounting elements, the optical accessory can include more or fewer mounting elements. For example, in some embodiments, the optical accessory includes one, two, four, five, six, seven, eight, or more mounting elements spaced around the illumination board. In some embodiments, the mounting element is in the form of an arcuate (e.g., ring-like) mounting element disposed along a surface of the optical accessory. In some embodiments, a ring-like mounting element can be in the form of a single ring-like magnetic element.]

While the mounting recesses have been generally described as being substantially round to receive substantially round mounting elements, other configurations are possible. For example, in some embodiments, if the mounting elements have a different cross-sectional shape, the mounting recesses typically have a similar cross-sectional shape, such as other curved shapes (e.g., oblong, ellipsoid, or oval shapes), polygonal shapes (e.g., rectangular, square, pentagonal, hexagonal, or other polygonal shapes), or a shape including a combination of one or more curved and/or straight sides. For example, in some embodiments, when mounting elements having a generally square cross-sectional shape are used, the mounting recesses also have a generally square cross-sectional shape to accommodate the mounting elements.]

While the structural base has been described as a generally round illumination board (e.g., a circuit board) having a central hole formed, illumination boards of other sizes and/or shapes are possible. For example, in some embodiments, the structural base has a different outer shape, such as other curved shapes (e.g., oblong, ellipsoid, or oval shapes), polygonal shapes (e.g., rectangular, square, pentagonal, hexagonal, or other polygonal shapes), or a shape including a combination of one or more curved and/or straight sides.

In some embodiments, the structural base does not include a hole for the camera lens to view the inspection field. For example, the structural base can include a transparent or semi-transparent region (e.g., a transparent region along the camera axis) through which the camera lens can view the inspection field.

In some embodiments, the structural base is formed multiple segments arranged around the camera lens. For example, the structural base can be formed of one or more segments that are disposed around the camera lens (e.g., on opposite sides of the camera lens).

While the structural base has been described generally as being a circuit board, other configurations are possible. In some embodiments, the structural base includes an enclosure-type device, such as a plastic body having electrical connections to power the illumination elements.

Camera Lens Attachment Devices

While the systems and methods described above that use magnetic elements to connect one or more optical accessories to a machine vision system have generally been described and illustrated as being implemented on illumination modules of the camera system, other configurations are possible. For example, other optical accessories, such as supplemental lens devices (e.g., a liquid lens device that can be adjusted to change the focal length of the camera system), can be attached to a camera system using magnet retention elements.

Figure 5:
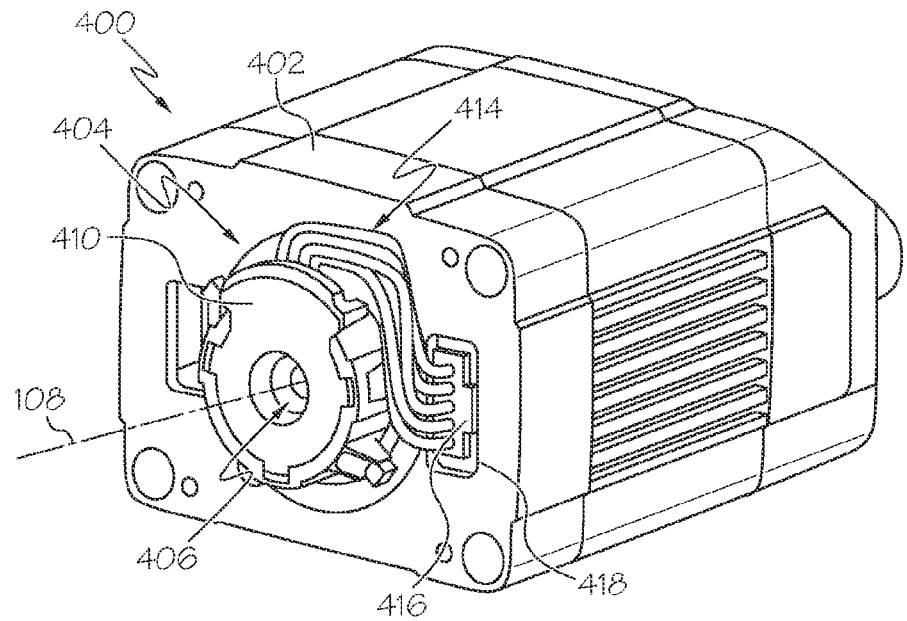
FIG. 5 is a perspective view of a machine vision system having a supplemental lens device magnetically connected to a lens of the machine vision system.
Figure 6:
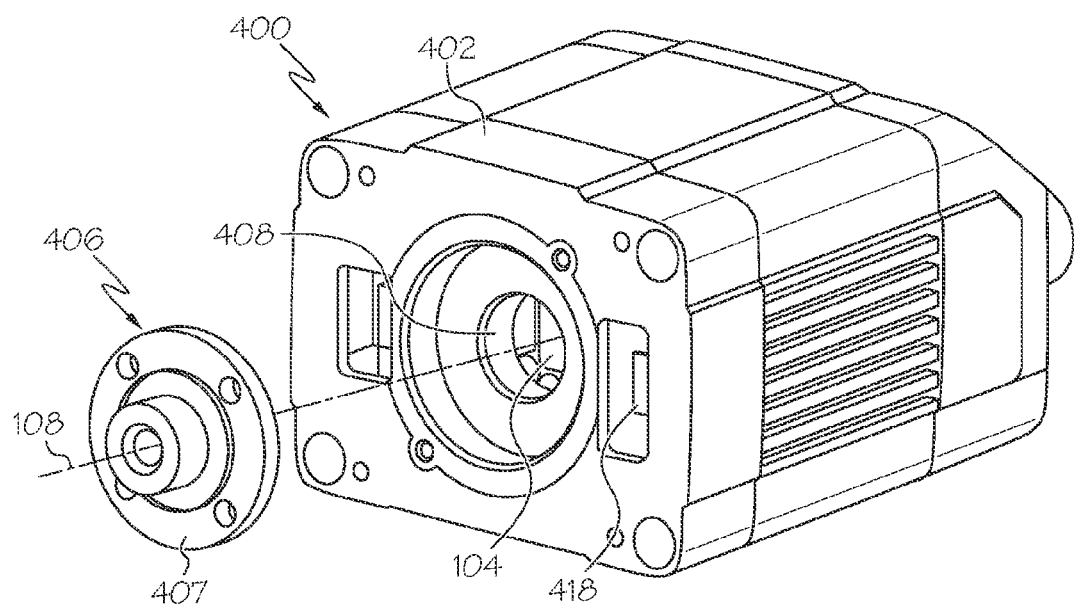
FIG. 6 is an exploded perspective view of the lens of FIG. 5 being installed into the machine vision system of FIG. 5.

Referring to FIGS. 5 and 6, in some embodiments, a machine vision system 400 includes a housing 402, an imaging sensor 104 arranged within the housing 402, and an optical accessory (e.g., a supplemental lens device) 404 disposed on a lens 406 of the imaging sensor 104 along a camera axis 108 that is substantially perpendicular to the imaging sensor 104. The lens 406 is secured within a recess 408 of the housing 402 along an outer surface of the housing 402. The lens 406 can be secured using any of various attachment techniques including being fastened via a threaded connection, connected using adhesives, or otherwise connected (e.g., welded or integrally molded within the housing 402). Referring to FIG. 6, which illustrates the machine vision system 400 without the supplemental lens device 404 and with the lens 406 removed from the housing 402, the lens 406 includes a retaining element (e.g., a ferromagnetic retaining ring) 407 that is configured to be engaged by a magnetic element (e.g., a permanent magnet) 412 of the supplemental lens device 404. For example, as discussed below, during installation, the supplemental lens device 404 can be placed onto the lens 406 so that the magnetic element 412 can provide a magnetic retention force securing the supplemental lens device 404 to the retaining ring 407 of the lens 406, thereby securing the supplemental lens device 404 to housing 402. While the lens 406 has been described as including a retaining ring to engage the magnetic element, the lens can include retaining elements of other shapes and sizes that are configured to be magnetically coupled to the magnetic element 412.

Figure 7:
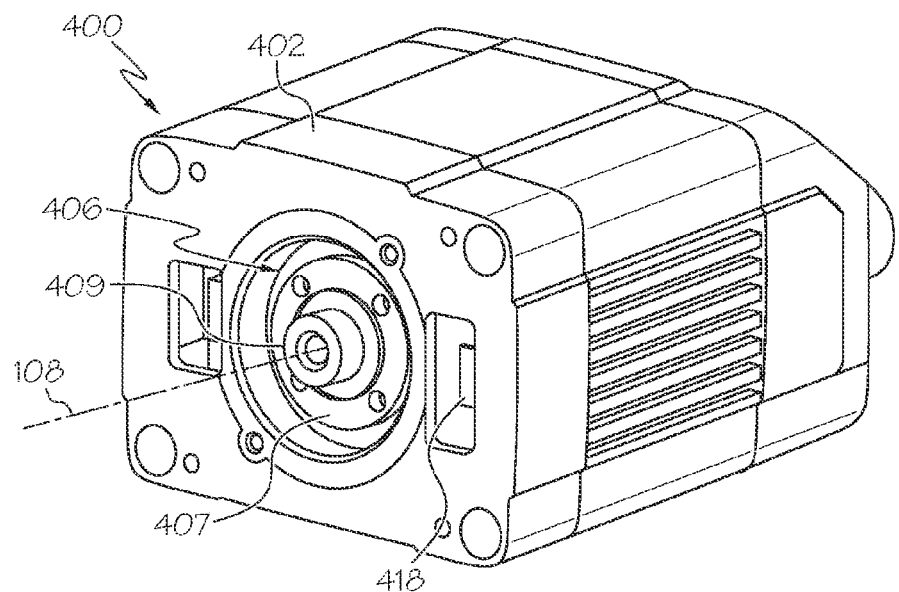
FIG. 7 is a perspective view of the lens of FIG. 5 installed into the machine vision system of FIG. 5.
Figure 8A:
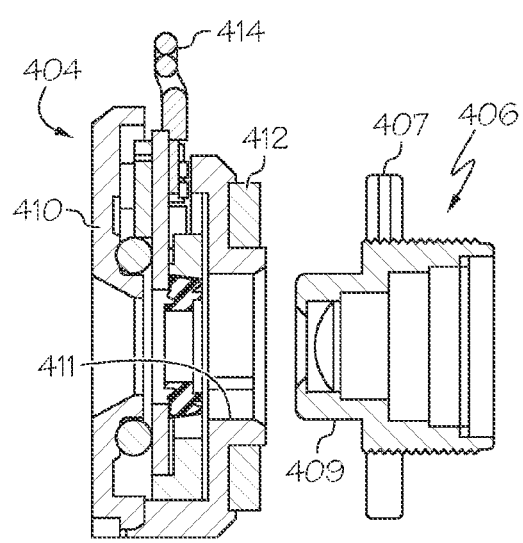
FIGS. 8A and 8B are sequential cross-sectional views of the supplemental lens device of FIG. 5 being connected to the lens of the FIG. 7.

The supplemental lens device 404 includes a lens module 410, the magnetic element 412 (also shown in FIGS. 8A and 8B), and a wire harness 414 that electrically connects the lens module 410 to the machine vision camera system 400. For example, as illustrated in FIG. 7, a connector 416 of the wire harness 414 can be inserted and connected to a connector receptacle 418 arranged along a front face of the housing 402. The connector receptacle 418 can be electrically connected to the internal electrical components of the machine vision camera system 400 or to a control unit that operates the machine vision camera system 400. The lens module 410 can include any of various lens adjusting or altering devices or components. In the example illustrated and described herein, the lens module 410 includes a camera focusing system, such as an autofocus system (e.g., a liquid lens system) that can be adjusted (e.g., adjusted remotely electronically) in order to change the focal length of the machine vision camera system 400.

In some embodiments, the lens module 410 can additionally or alternatively include other types of optical accessories or devices, such as illumination devices, camera focus systems (e.g., autofocus lens systems (e.g., liquid lens systems)), camera protective devices (e.g., protective lens cap devices), and optical filters.

The magnetic element 412 is sized and configured to magnetically couple to the retaining ring 407 disposed along the lens 406. For example, the magnetic element 412 is configured to produce a magnetic field that generates a magnetic retention force that is sufficient to couple the supplemental lens device 404 to the housing 402. For example, in some embodiments, the magnetic retention force generated between the magnetic element 412 and the retaining ring 407 can be about 0.5 lbf to about 5 lbf.

The magnetic element 412 is typically in the form of a common permanent magnet, such as a composite permanent magnet (e.g., a ceramic magnet, a ferrite magnet, an alnico magnet, or a flexible magnet). In the example illustrated, the magnetic element is a neodymium type magnetic element. Alternatively or additionally, other types of magnets could be used, such as other permanent magnets (e.g., rare-earth magnets or single-molecule magnets) or electromagnets.

Figure 8B:
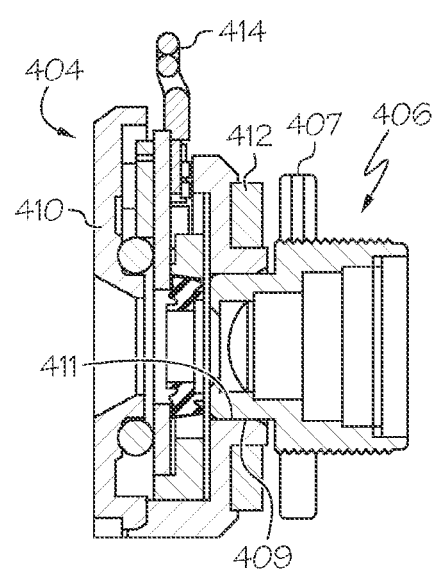

To install the lens 406 and the supplemental lens device 404 onto the housing 402, first the lens 406 is fastened to the housing (e.g., within the recess 408 of the housing 402). In the example shown, the lens 406 is threadedly secured within the recess 408. Once secured into the recess 408, a cylindrical portion 409 of the lens 406, which is substantially aligned along the camera axis 108, extends outwardly from the housing 402 to support and align the lens module 410. Then, referring to FIGS. 8A and 8B, the supplemental lens device 410 is aligned with the lens 406 so that a lens receiving opening 411 of the supplemental lens device 404 is positioned in front of the cylindrical portion 409 of the lens 406. Once aligned, the supplemental lens device 404 can be placed onto the lens 406 so that the cylindrical portion 409 is inserted into and accommodated within the lens receiving opening 411 and the magnetic element 412 is positioned in proximity to the retaining ring 407 so that a magnetic retention force is generated between the magnetic element 412 and the retaining ring 407. As shown in FIG. 8B, the magnetic element 412 and the retaining ring 407 do not necessarily need to be in contact with one another when installed, as long as they are in close enough proximity in order to generate an adequate magnetic retention force. Spacing the magnetic element 412 and the retaining ring 407 apart from one another can help to reduce the likelihood of an improper fit of the supplemental lens device 410 onto the lens 406, for example, as a result of variations in length of the lens 406 or the supplemental lens device 410. For example, in some cases, the spacing between the magnetic element 412 and the retaining ring 407 can be used to accommodate for tolerance variations in the length of the lens 406 that can be up to about 0.5 millimeters.

Once magnetically secured to the lens 406 axially along the camera axis 108, the supplemental lens device 404 can typically be rotated about the camera axis 108. For example, in some embodiments, the supplemental lens device 404 is rotated about the camera axis 108 to align the lens module 410 according to a desired inspection field to be viewed and imaged by the machine vision camera system 400. Additionally, the supplemental lens device 404 can be rotated to align the wire harness 414 and connector 416 so that the connector 416 and be inserted into the connector receptacle 418 to provide power and control signals to the supplemental lens device 404 or send signals (e.g., measurement signals, such as liquid lens membrane stress signals) to the machine vision system 400.

While the electrical connection between the optical accessory and the camera device has been described and illustrated as being achieved via electrical connectors having deflectable electrical contact pins, the electrical connection can be established using any other suitable electrical connectors. For example, in some embodiments, the optical accessory can include any of other various types of electrical connectors (e.g., a plug and socket style connector, a blade-style connector, a jack connector (e.g., a registered jack connector), a USB-style connector, a power connector, a terminal block style connector, or other suitable types of connectors). For example, the electrical attachment element can include a male or female style, and the housing can include the opposite, mating electrical connector.

In some embodiments, the electrical attachment element includes an external electrical connector that is wired to the structural base (i.e., and not disposed within or on one of the mounting elements). Using such a separate wired connector, the structural base can be attached to the camera housing (e.g., using a magnetic retention force), and then the wired connector can be connected to an adjoining connector within the housing (e.g., inserted into a mating connector disposed in the camera housing).

In some embodiments, the optical accessory includes a magnetic element on one of mounting elements to secure the optical accessory to the housing and also a connector having deflectable pin connectors and an additional magnetic element to connect the deflectable pins.

While the optical accessory (e.g., the supplemental device lens device) has been described as being electrically connected to the machine vision camera system to receive electrical power and control, other configurations are possible. For example, in some embodiments, the optical accessory is connected (e.g., electrically connected using the wire harness) to an electrical source external from the machine vision camera system. In some embodiments, the optical accessory is manually adjustable (e.g., by hand) and is not electrically connected to the machine vision camera system.

Other embodiments are within the scope and spirit of the following claims.

What is claimed:

1. A camera accessory separate from and removably connected to a machine vision device, the camera accessory comprising:
   a structural base defining a first surface and a central viewing area through which the machine vision device can inspect a field of view;
   at least one mounting element extending from a second surface of the structural base to engage a surface of the separate machine vision device; and
   a magnetic element arranged at a distal end of one of the at least one mounting elements, the magnetic element generating a magnetic retention force that removably secures the structural base to the surface of the separate machine vision device.

2. The camera accessory of claim 1, further comprising an alignment feature that limits the orientation of the camera accessory relative to the machine vision device.

3. The camera accessory of claim 1, wherein the at least one mounting element comprises a first mounting element and a second mounting element, and the alignment feature comprises a size and/or shape of the first mounting element being different than a size and/or shape of the second mounting element.

4. The camera accessory of claim 1, wherein the at least one mounting elements comprises at least two mounting elements and the alignment feature comprises a difference in angular spacing between two adjacent mounting elements relative to a central axis of the accessory.

5. The camera accessory of claim 1, wherein the magnetic element comprises a first magnet and the alignment feature comprises an arrangement of the first magnet relative to the machine vision device.

6. The camera accessory of claim 1, wherein the at least one mounting element comprises an elongated member extending from the second surface.

7. The camera accessory of claim 1, further comprising an electrical attachment element coupled to the structural base, the electrical attachment element electrically connecting at least one illumination element on the first surface of the structural base to at least one of a power source, a control device, or a signal generating device of the machine vision device.

8. The camera accessory of claim 1, wherein the magnetic element comprises a ferromagnetic element generating the magnetic retention force with a magnet disposed along the surface of the machine vision device.

9. The camera accessory of claim 7, wherein the electrical attachment element comprises an electrical contact region along a distal end of the at least one mounting element, the electrical contact region upon contact with a mating electrical contact surface, electrically connecting the optical accessory to the at least one of the power source or the control device.

10. The camera accessory of claim 9, wherein the electrical attachment element comprises one or more resilient, deflectable electrical connecting pins.

11. The camera accessory of claim 9, wherein the magnetic retention force connects the electrical contact region to the mating electrical contact surface.

12. The camera accessory of claim 1 further comprising a camera lens illumination module and the structural base comprises an illumination board comprising at least one illumination element disposed along the first surface.

13. The camera accessory of claim 1, wherein the surface of the machine vision device comprises a surface of a ferromagnetic retaining element disposed around the lens.

14. The camera accessory of claim 7, wherein, when connected to a power source, the electrical attachment element provides electrical power to adjust a focal distance of the machine vision device.

15. A camera system comprising:
a camera enclosure;
a lens disposed in or along a front face of the camera enclosure along an optical axis of the camera system; and
an optical accessory removably attached along the front face of the camera enclosure in a separable and replaceable manner around the lens, the alignment feature accessory being attached using a magnetic retention force that is provided by at least one magnetic element and comprises an alignment device that limits an installed orientation of the optical accessory relative to the camera enclosure.

16. The camera system of claim 15, wherein the at least one magnetic element is a component of the optical accessory.

17. The camera system of claim 15, wherein the magnetic retention force is generated between a first magnetic element of the at least one magnetic element that is disposed on the optical accessory and a ferromagnetic retaining element disposed on the lens, and in an attached configuration, the first magnetic element is spaced apart from the ferromagnetic retaining element.

18. The camera accessory of claim 1, wherein the lens comprises an adjustable lens that changes an optical characteristic of the machine vision device.

* * * * *